Feb. 28, 1950  R. H. McCLURE  2,499,072
VALVE FOR VEHICLE JACKS
Filed Oct. 17, 1945  3 Sheets-Sheet 1

INVENTOR
Ralston H. McClure

BY
ATTORNEYS

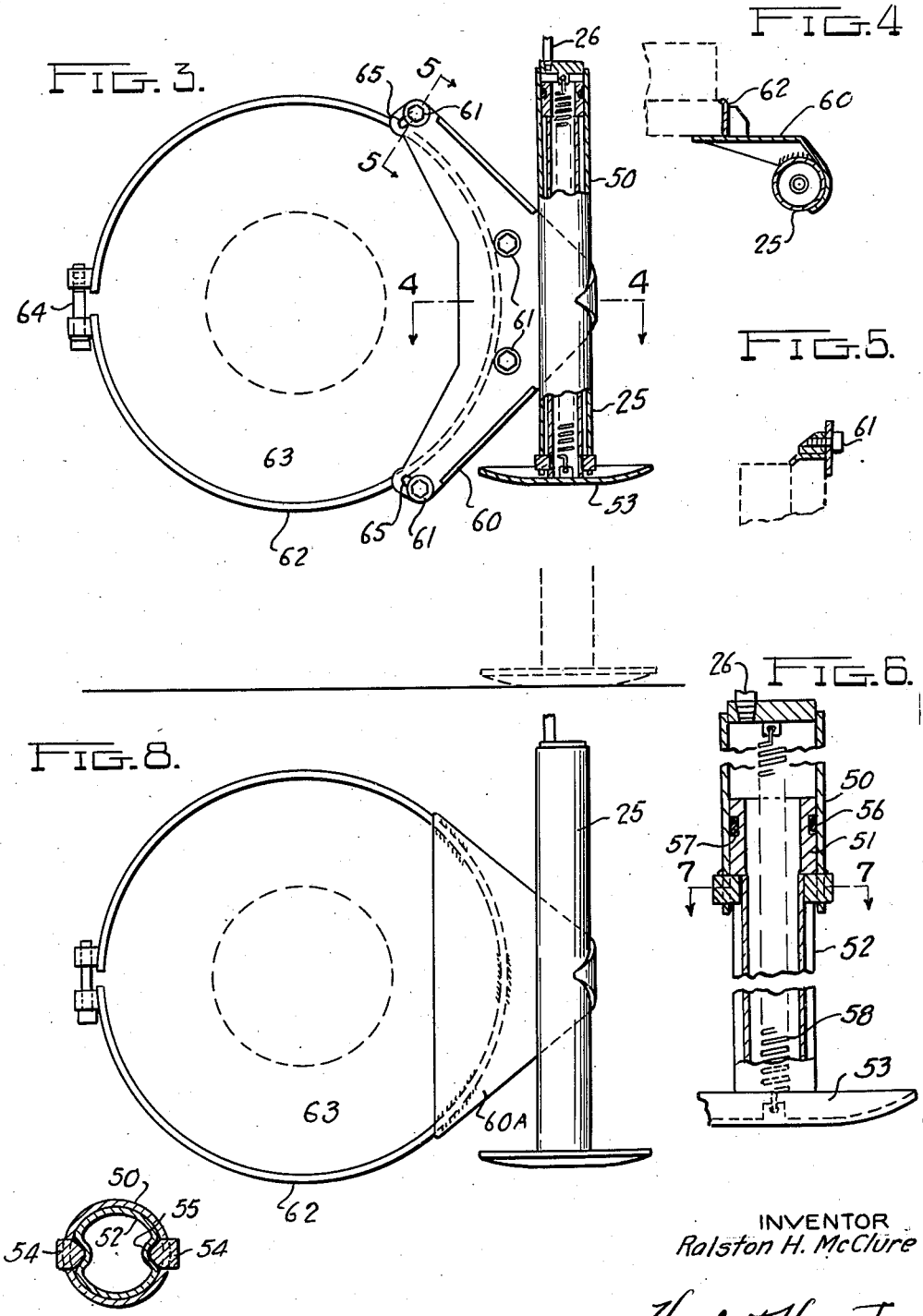

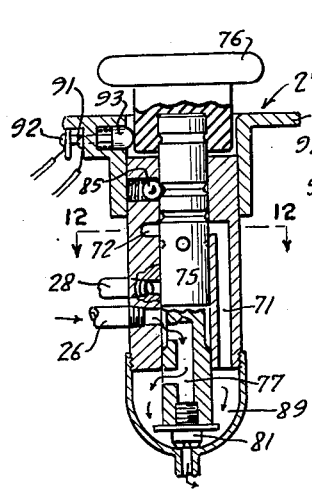

Patented Feb. 28, 1950

2,499,072

UNITED STATES PATENT OFFICE 2,499,072

VALVE FOR VEHICLE JACKS

Ralston H. McClure, Detroit, Mich., assignor of one-third to Wiley K. Crowder and one-third to Worthan A. Snell, both of Detroit, Mich.

Application October 17, 1945, Serial No. 622,833

1 Claim. (Cl. 251—4)

The present invention relates to jacks for vehicles and more specifically to jacks permanently mounted at each of the wheels of such vehicle.

Among the objects of the invention is a jacking system wherein a jack is preferably fixed to the vehicle axle housing adjacent each of the wheels and means for selectively actuating the several jacks.

Another object is a jacking system in which the jacks are fixed to an unsprung portion of the vehicle so that, in lifting the wheel, the spring or springs remain in compression.

Another object is such a jack system in which any one or all of the jacks may be actuated.

Another object is a jack system which is operable independently of the vehicle motor.

Still another object is a jack system which is simple in construction and installation and which cannot easily get out of order.

Other objects and advantages will be apparent to those skilled in the art upon reference to the following description and the accompanying drawings in which Fig. 1 is a side elevation of an automobile indicating the preferred location of the parts of the system.

Fig. 3 is a view of a jack mounting and showing the jack in section.

Fig. 4 is a section on line 4—4 of Fig. 3.

Fig. 5 is a section on line 5—5 of Fig. 3.

Fig. 6 is a somewhat larger longitudinal central section of one of the jacks.

Fig. 7 is a section on line 7—7 of Fig. 6.

Fig. 8 is an elevation of a modified jack mounting means.

Figs. 9, 10 and 11 are central longitudinal sectional views of the control valve showing the latter in three positions.

Figure 1:
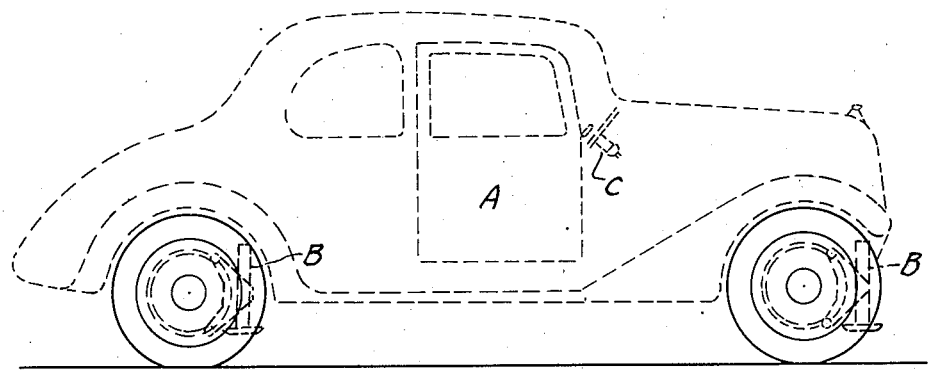

Figs. 12, 13 and 14 are sectional views of the valve on lines 12—12, 13—13, and 14—14, respectively, of Fig. 9.

Fig. 15 is a top plan view of the valve.

Fig. 16 is a sectional view of the pressure limiting switch.

Fig. 17 is a longitudinal central section of the fluid pump.

Fig. 18 is a section on line 18—18 of Fig. 17.

As indicated above, and in the drawings, the invention consists in a plurality of jacks to be mounted one at each wheel of a vehicle, and means for actuating a selected one or all simultaneously to lift one or all of the wheels of the vehicle.

In the drawings, an automobile is indicated at A with jacks at B, each of the latter being fixed to an axle or axle housing adjacent the wheel, and having at C a control valve, this being preferably mounted upon the instrument board or other suitable position easily accessible to the operator of the vehicle.

Figure 2:
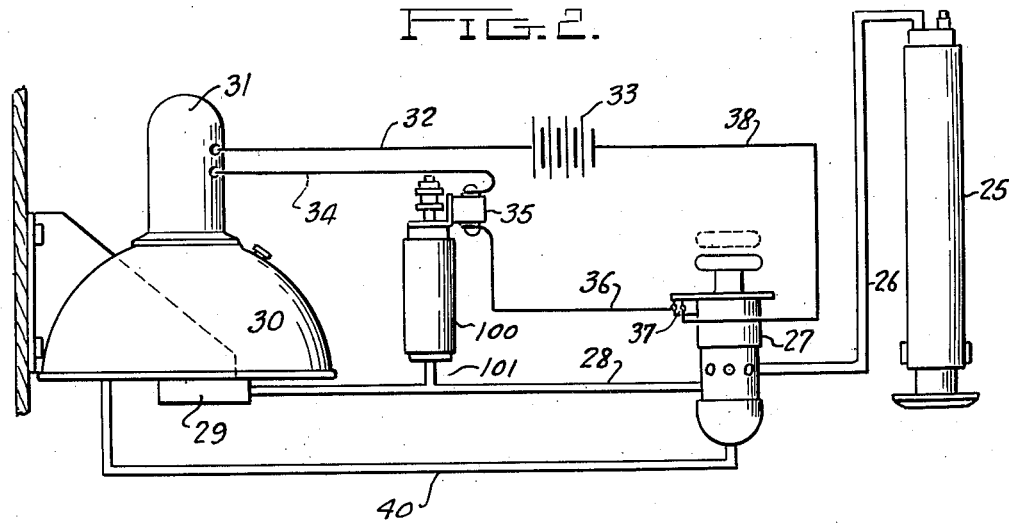
Fig. 2 is a more or less diagrammatic view showing the essential parts of the system and their connections, but showing only a single jack.

In Fig. 2 is shown more or less diagrammatically the essential elements of the embodiment of the invention, only one jack being shown. In this figure, a hydraulic jack—described in detail later—is shown at 25 having connected thereto a fluid conduit 26 leading from a control valve 27.

Fluid under pressure is supplied to the valve 27 through a conduit 28 from a pump 29 which draws such fluid from a reservoir 30. The pump 29 is actuated by an electric motor 31 receiving current through a lead 32 from a battery or other source 33, the return lead from motor 31 to source 33 being through lead 34, automatic pressure controlled switch 35, connection 36, hand switch 37, and lead 38.

Fluid return from the jack 25 to reservoir 30 is through conduit 26, valve 27, and conduit 40.

Taking now the several elements in order, the form of jack and its mounting is shown in detail in Figs. 3 to 8 inclusive.

In these figures, the jack 25 is shown as of quite simple construction and shown to consist of an outer cylinder 50, closed at its upper end and connected to the fluid conduit 26. This cylinder is fixed to the axle housing as described below and has slidable in it a piston 51 carried on the upper end of a second tube 52 extending from the lower end of the cylinder 50 and having on its lower end a foot piece 53, which closes the latter tube against leakage of fluid.

Fixed in the lower end of cylinder 50 at diametrically opposite points is a pair of guide lugs 54 adapted to coact with grooves 55 formed in the side walls of tube 52 below the piston 51 to act as stops for tube 52 and also to prevent rotation of the latter.

The piston 51 is shown as provided with a suitable packing 56 consisting of a ring of a suitable synthetic rubber, preferably neoprene or other fluid-resisting material, carried in a circumferential groove 57 in the piston.

Also carried within the cylinder 50 and tube 52 and fixed to the end closures of these parts is a tension spring 58 which is preferably under some tension when the jack is retracted.

As indicated in Figs. 3, 4 and 5, the jack 25 may be mounted adjacent a wheel by welding it upon a roughly triangular bracket 60 which in turn is bolted as at 61 to a ring 62 adapted to surround the mud excluding edge of the brake anchor plate 63 which latter is of course a fixed element of the axle housing. The ring 62 is fixed in place by drawing together its ends as by a bolt 64 and adjustment of the position of the jack accomplished by moving the ring 62 or a limited adjustment provided for by slotting the bolt holes in bracket 60, such slotted holes being shown at 65.

A modified form of mounting for the jack 25 is shown in Figure 8, in which the jack is shown as welded to a triangular plate 60A which in turn is welded to the ring 62.

The control valve 27 is shown in detail in Figures 9 to 15 and consists of a cylinder 70 having a central bore and a wall of sufficient thickness to accommodate a longitudinal passage 71 open to one end of the cylinder and connected at its other end to an inner peripheral groove or channel 72.

The conduit 28 is open to cylinder 70 at a point near the lower end thereof and between conduit 28 and the lower end of cylinder 70 and equispaced around the cylinder are the conduits 26 leading to the several jacks 25.

Slidably fitted in cylinder 70 is a valve member 75 provided with a suitable knob 76 by means of which it may be rotated and/or moved longitudinally. It is also provided with a short axial bore 77 in its lower end and with a wide circumferential groove 78 which opens to the bore 77 through a radial passage 79. Also opening to bore 77 is a radial passage 80. The lower end of bore 77 is preferably closed by a screw 81 provided with a kerf and extending well below the valve 75.

The upper end portion of valve 75 is provided with two circumferential grooves 82 and 83 and four indentations 84 adapted to coact with a suitable spring pressed ball detent 85 serving to hold the valve in its several positions.

Further, the upper end of cylinder 70 is fixed within a suitable flanged collar 90 which serves to mount the valve assembly on the vehicle and also carries a suitable switch adapted to complete the motor circuit for operation of the jacks. This switch is shown as consisting of a stationary contact 91 and a movable contact 92 carried on a plunger 93 mounted radially in collar 90 and urged toward closed position by a spring 94. The inner end of plunger 93 extends into the counterbore 95 of the collar into the path of the knob 76 so that when the knob is moved to its most inward position the circuit is opened.

In the operation of the valve, in its inward position (Figure 9), the circuit is broken at switch 91—92 and the several passages are as follows:

The pressure line 28 is closed, and the lines 26 from the jacks are open to groove 78 and, through 79, 77, and 80 connected to the chamber 89 at the lower end of cylinder 70. The chamber 89 is connected to return conduit 40.

In the position of Figure 10, the valve 75 has been withdrawn so that the ball detent is in groove 82 and the knob 76 has moved away from plunger 93 so that the switch 91—92 is closed. Further, the groove 78 has moved up to close passage 80 and thereby close the return way. This groove 78 is of sufficient width to bridge the inlet 28 and the jack conduits 26, so that, in this position, all four jacks are operated simultaneously.

In the position of Figure 11, the valve has moved up until the detent 85 coacts with the indentations 84 and groove 78, while still open to inlet 28 is closed to outlets 26. Fluid, however, can flow from groove 78 into passage 77 through passage 79, and from passage 77 through passage 80 into whichever jack conduit 26 happens to register therewith. The particular jack conduit 26 will, of course, be determined by the rotative position of valve 75, and this will be indicated by the ball detent and also by suitable indications on the knob 76, and collar 90. For example, the knob may, as shown in Figure 15, carry an arrow 76A and the collar, the lettering as shown, indicating the four jacks.

As indicated above, the motor circuit is also controlled by a pressure limiting device actuating the switch 35 and such a device is shown in Figure 16 to consist of a cylinder 100 connected by a short conduit 101 to the pressure conduit 28 and containing a piston 102, the upward movement of which is resisted by a spring 103 selected or calibrated to resist pressures up to a predetermined amount. The piston 102 is fixed to a piston rod 104 extending up through the cover member 105 and carrying at its outer end a switch actuating element 106 adapted to open or close the switch 35.

Figures 17 and 18 illustrate the construction of pump 29. This may consist of a body portion 110, preferably welded to the bottom of reservoir 30 and provided with a cylinder 111 into which leads an inlet 112, and having an outlet and valve therefor 113, to which is connected the conduit 28. Operating in cylinder 111 is a piston 114 having integral therewith a yoke 115 in which rotates the eccentric 116 fixed to the bottom end of the shaft 117 which is an extension of the shaft of motor 31.

I claim:

A distributing valve for a plurality of hydraulic devices comprising a casing having an inlet port for admission of fluid under pressure, a plurality of outlets ports at equidistantly spaced points around the same and in the same plane and a return port; a valve body mounted in said casing for longitudinal movement and rotation therein, said body having an axial bore closed at both ends, a pair of radial passages leading into and communicating with said bore and a wide annular groove around its periphery communicating with one of said radial passages; and means indicating a plurality of longitudinal selected positions of said body in said casing, in one of said selected positions of said valve body the outlet ports communicate with the groove and the bore through one of said radial passages, and the other radial passage is open to said return port; in another selected operative position of the valve body in said casing the groove communicates with said inlet port and all of the outlet ports, with the radial passages cut off from the return port; and in another final selected position of said valve body the groove is open to the inlet port and the bore through one of said radial passages and through the other radial passage to an individual outlet port selectable through rotation of said body in said casing.

RALSTON H. McCLURE.

REFERENCES CITED

The following references are of record in the file of this patent:

UNITED STATES PATENTS

| Number | Name | Date |
|---|---|---|
| 728,611 | Potter | May 19, 1903 |
| 1,300,107 | Bacon | Apr. 8, 1919 |
| 1,711,565 | Hatfield et al. | May 7, 1929 |
| 1,743,005 | Resler | Jan. 7, 1930 |
| 1,780,972 | Neuberg | Nov. 11, 1930 |
| 1,907,208 | Lebel | May 2, 1933 |
| 1,952,127 | Goldman | Mar. 27, 1934 |
| 2,109,238 | Sessions | Feb. 22, 1938 |
| 2,353,855 | Schwarz | July 18, 1944 |
| 2,401,787 | McClure | June 11, 1946 |